United States Patent
Dickens et al.

(10) Patent No.: US 7,546,448 B2
(45) Date of Patent: Jun. 9, 2009

(54) BOOT ARCHITECTURE DISCOVERY IN PRE-BOOT ENVIRONMENT

(75) Inventors: Christopher Scott Dickens, Issaquah, WA (US); Asad Yaqoob, Redmond, WA (US); Saad Syed, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 11/358,761

(22) Filed: Feb. 21, 2006

(65) Prior Publication Data

US 2007/0198819 A1    Aug. 23, 2007

(51) Int. Cl.
G06F 9/24 (2006.01)
G06F 15/177 (2006.01)

(52) U.S. Cl. .......................... 713/1; 713/2; 713/100; 709/203; 709/226; 709/232

(58) Field of Classification Search .................. 713/1, 713/2, 100; 709/203, 226, 232
See application file for complete search history.

(56) References Cited

U.S. PATENT DOCUMENTS

| | | | |
|---|---|---|---|
| 5,933,631 A | 8/1999 | Mealey et al. | |
| 6,807,558 B1 | 10/2004 | Hassett et al. | |
| 6,816,964 B1 | 11/2004 | Suzuki et al. | |
| 7,251,725 B2 * | 7/2007 | Loison et al. | 713/1 |
| 7,305,561 B2 | 12/2007 | Hunt et al. | |
| 7,330,118 B2 | 2/2008 | Durham et al. | |
| 7,467,295 B2 | 12/2008 | Erickson et al. | |
| 2002/0120721 A1 * | 8/2002 | Eilers et al. | 709/220 |
| 2002/0198972 A1 * | 12/2002 | Babbitt et al. | 709/222 |
| 2003/0005096 A1 * | 1/2003 | Paul et al. | 709/222 |
| 2003/0131152 A1 | 7/2003 | Erlingsson | |
| 2004/0081104 A1 | 4/2004 | Pan et al. | |
| 2005/0180326 A1 | 8/2005 | Goldflam et al. | |
| 2006/0143432 A1 | 6/2006 | Rothman et al. | |
| 2007/0157016 A1 | 7/2007 | Dayan et al. | |
| 2008/0046708 A1 | 2/2008 | Fitzgerald et al. | |

FOREIGN PATENT DOCUMENTS

JP    2002169694    6/2002

OTHER PUBLICATIONS

Cowan, Paul, "What is PXE?", White Paper, 2001, 8 pages, 3Com Corporation, Santa Clara, CA.

* cited by examiner

*Primary Examiner*—Thomas Lee
*Assistant Examiner*—Michael J Brown
(74) *Attorney, Agent, or Firm*—Senniger Powers LLP

(57) ABSTRACT

Identifying characteristics of a client in a pre-boot environment. A packet is received from the client. The packet includes a request for an image to boot the client by a computing device. An application is transmitted from the computing device to the client in response to the received packet. The client executes the transmitted application. A response is received from the application executed by the client. The characteristics of the client are determined based on the received response. An image to boot the client is transmitted, and the transmitted image is a function of the determined characteristics.

20 Claims, 6 Drawing Sheets

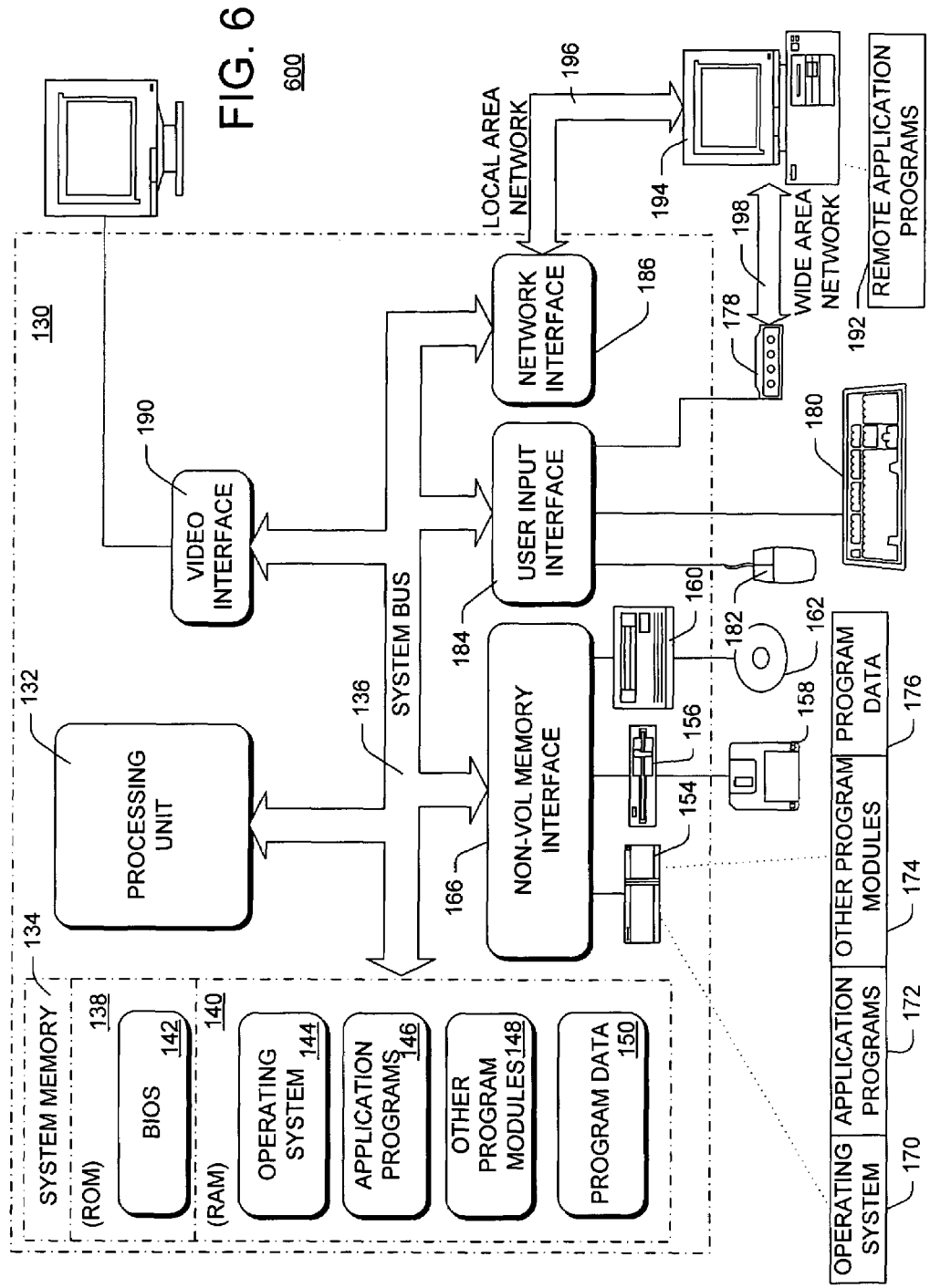

BOOT ARCHITECTURE DISCOVERY IN PRE-BOOT ENVIRONMENT

BACKGROUND

When deploying an operating system to multiple computing devices, it is beneficial to utilize tools to automate the deployment process. For example, in a computing device manufacturing process, an original equipment manufacturer (OEM) typically installs an operating system (OS) with standard configurations or a standard OS to the computing device before customers purchase them at retail stores or over the Internet. In a corporate setting, a business may need to upgrade a number of identically configured machines simultaneously and efficiently using such automated process.

Typically, the standard OS is deployed and installed automatically to the computing devices by copying or duplicating a predetermined OS image to the computing device for booting the computing device. For example, the automated deployment and installation process would install the OS with standard configurations on a memory storage area of each of the computing devices via a wired or a wireless connection. Upgrades to OS or other applications may be installed in a similar fashion.

However, with the ongoing advancements and developments in storage medium and computing device processing powers, installing a standard set of OS image to a number of computing devices no longer accounts for proper configuration of the computing devices.

One available system, Pre-Boot Execution Environment (PXE) protocol, allows a client to obtain an OS image from a PXE server in a networked environment. The client initiates the PXE process by broadcasting a PXE request in the networked environment. However, any PXE server listening for a request can read and choose to respond to the client. A disadvantage results if more than one PXE server exists in the networked environment because the client will be serviced by whichever PXE server responds the quickest to the client's request. For example, if two PXE servers are in the networked environment, the first configured with application logic to service personal computer clients and a second configured to service any type of device (e.g., personal computers, point of sale devices, and network servers), it is not possible to determine which PXE server will be the first to respond to the request from a point of sale device client. Therefore, it is possible that, while using the PXE protocol, the point of sale device may incorrectly receive a boot image for a personal computer.

In addition, not only does an entity needs to deploy an OS on a number of different classes of computing devices, from personal digital assistant (PDA), to server computers, to point of sale terminals, the entity also needs to consider that each class of the computing devices may require particular configurations due to hardware components. For example, a PDA X with a chip having a processing power of 500 MHz and a storage memory capacity of 5 GB may require a different OS image from another PDA Y in the same production line with a chip having a processing power of 733 MHz and a storage memory capacity of 10 GB. As such, the existing OS image deployment systems of installing an OS with standard configuration or a standard OS image would not properly configure the PDA Y because both PDA X and PDA Y would receive the same OS image for booting the devices. In addition, current OS image deployment systems lack the ability to properly detect differences in hardware components in the computing devices to efficiently deploy and install appropriate OS images to the computing devices.

SUMMARY

Embodiments of the invention overcome the shortfalls of the existing OS deployment systems by first detecting the computing architecture of the client before sending an appropriate boot OS image file to boot the client. In particular, embodiments of the invention deploy or transmit an application to the client in response to a request to boot the client with an OS image.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 6 is a block diagram illustrating one example of a suitable computing system environment in which the invention may be implemented.

Corresponding reference characters indicate corresponding parts throughout the drawings.

DETAILED DESCRIPTION

Figure 1:
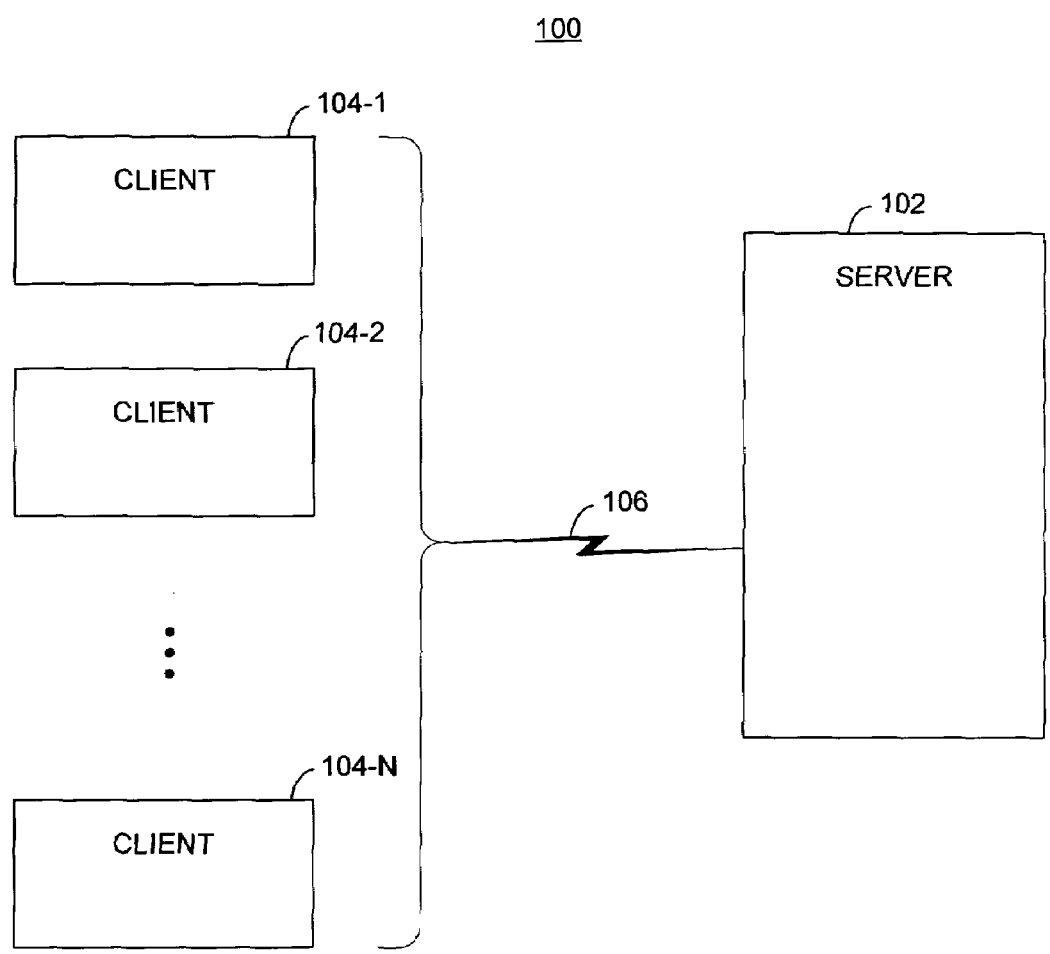
FIG. 1 is a block diagram illustrating an exemplary system for implementing embodiments of the invention.

Referring to FIG. 1, the system 100 illustrates an exemplary embodiment in which aspects of the invention may be implemented. A server 102, which may be one of a plurality of servers, includes components that enable the deployment of an operating system (OS) to a plurality of clients 104 via a networked environment 106. In one embodiment, the server 102 deploys the OS, such as MAC® OS X, UNIX®, Linux®, or Windows Vista™ operating system to the clients 104. The server 102 and the clients 104 may communicate via a number of underlying network transport mechanisms available in the networked environment 106. In one embodiment, the transport mechanisms include, Transmission Control Protocol (TCP), Trivial File Transfer Protocol (TFTP), User Datagram Protocol (UDP), Remote Procedure Call (RPC), File Transfer Protocol (FTP), HyperText Transfer Protocol (HTTP), or the like. In one example, server 102 in system 100 includes a server 200 described in FIG. 2.

The clients 104 include one or more computing devices, such as a desktop computer, a laptop computer, a personal digital assistant (PDA), or other devices. In another embodiment, server 102 and each of the clients 104 implement at least a part of a computer 130 depicted in FIG. 3.

In one example, system 100 may be used in a pre-boot execution environment (PXE). For example, server 102 may be a PXE server which watches for dynamic host configuration protocol (DHCP) discovery requests that include a special tag identifying the client as a PXE client. If the discovery request includes the tag, the PXE server replies to the client with configuration information, including the name of a boot image file, which may include an OS boot image, pre-OS image file, pre-boot agents (e.g., computer-executable instructions for scanning clients 104 for viruses before installing an OS). The boot image file may transferred to clients 104 using TFTP, and the transferred file may be used to boot the clients 104.

Figure 2:
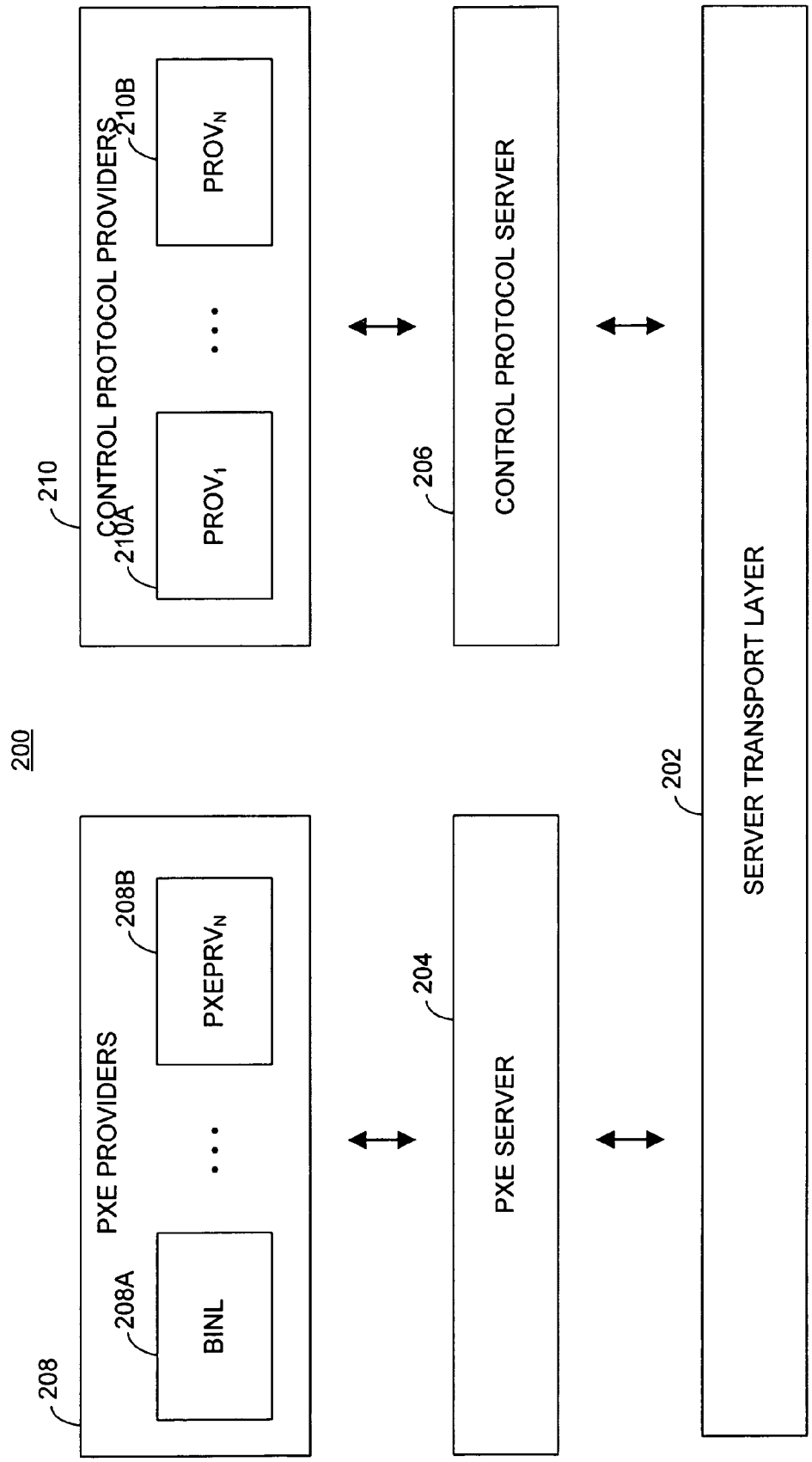
FIG. 2 is a block diagram illustrating an exemplary pre-boot environment according to an embodiment of the invention.

Referring now to FIG. 2, an exemplary embodiment of the server 200 of the invention is shown. The server 200 includes one or more components, such as a transport layer 202, a PXE server 204, and a Control Protocol Server 206. The transport layer 202 handles the details associated with communicating with clients and provides a transport-independent communication mechanism to the PXE Server 204 and the Control Protocol Server 206. In one embodiment, the transport layer 202 may communicate with the clients 104 utilizing a variety of network protocols including Transmission Control Protocol (TCP), User Datagram Protocol (UDP), Remote Procedure Call (RPC), and HyperText Transfer Protocol (HTTP).

The PXE server 204 accepts PXE requests from the clients 104. PXE is one of the components of the Wired for Management (WfM) specification that allows the clients 104 to boot from the PXE server 204 on a network prior to booting an operating system from a hard drive local to the clients 104. After receiving the PXE request from the client, the PXE server passes the request to a PXE provider 208. The PXE provider 208 is a component containing the application logic to formulate a response to the clients 104. In one embodiment, the PXE provider 208 is Boot Information Negotiation Layer 208A (BINL). The responsibilities of the BINL service 208 include answering the request, querying a directory service on behalf of the clients 104, as well ensuring that the correct policy and configuration settings are applied to the clients 104 during the operating system installation. In another embodiment, the PXE provider 208 includes two or more PXE providers 208, each with distinct application logic.

The Control Protocol Server 206 accepts requests from a reduced operating system environment. The reduced operating system aids in the deployment of the operating system. In one embodiment, the Control Protocol Server 206 accepts Microsoft® Windows® Preinstallation Environment (WinPE) requests. After receiving the request from the clients 104, the Control Protocol Server 206 passes the request to a Control Protocol Provider 210. The Control Protocol Provider 210 is a component containing the application logic to formulate a response to the clients 104. In one embodiment, the Control Protocol Provider 210 includes a plurality of providers, such as 210A, and 210B.

It is also to be understood that additional components connected, wired or wirelessly, to the server 200 may be added to perform operations of the transport layer 202, the PXE server 204, and the control protocol server 206.

Initially, a client (e.g., client 104-1) attempts to request to be booted by a server (e.g., PXE server 204). The request is received by the server which may be coupled with one or more other servers (e.g., a Windows® Deployment Services (WDS) server) or PXE providers for responding to the request.

In existing OS boot image file deployment systems, the server responds to the request by sending a standard or a predetermined OS boot image file to the client. For example, suppose the clients sending the requests include computing devices with 32-bit architecture and computing devices with 64-bit architecture. Current deployment systems would, regardless of the different computing architecture configurations, respond the request by sending a generic or standard OS boot image file. As such, all clients, either with 32-bit or 64-bit architecture, will receive the same boot image file (e.g., 32-bit boot image file). As such, under current deployment systems, the computing devices with 64-bit architecture need to perform additional evaluation and detection before sending another request to the server for a more appropriate OS boot image file, the 64-bit OS image, before the computing devices can boot accordingly.

Figure 3:
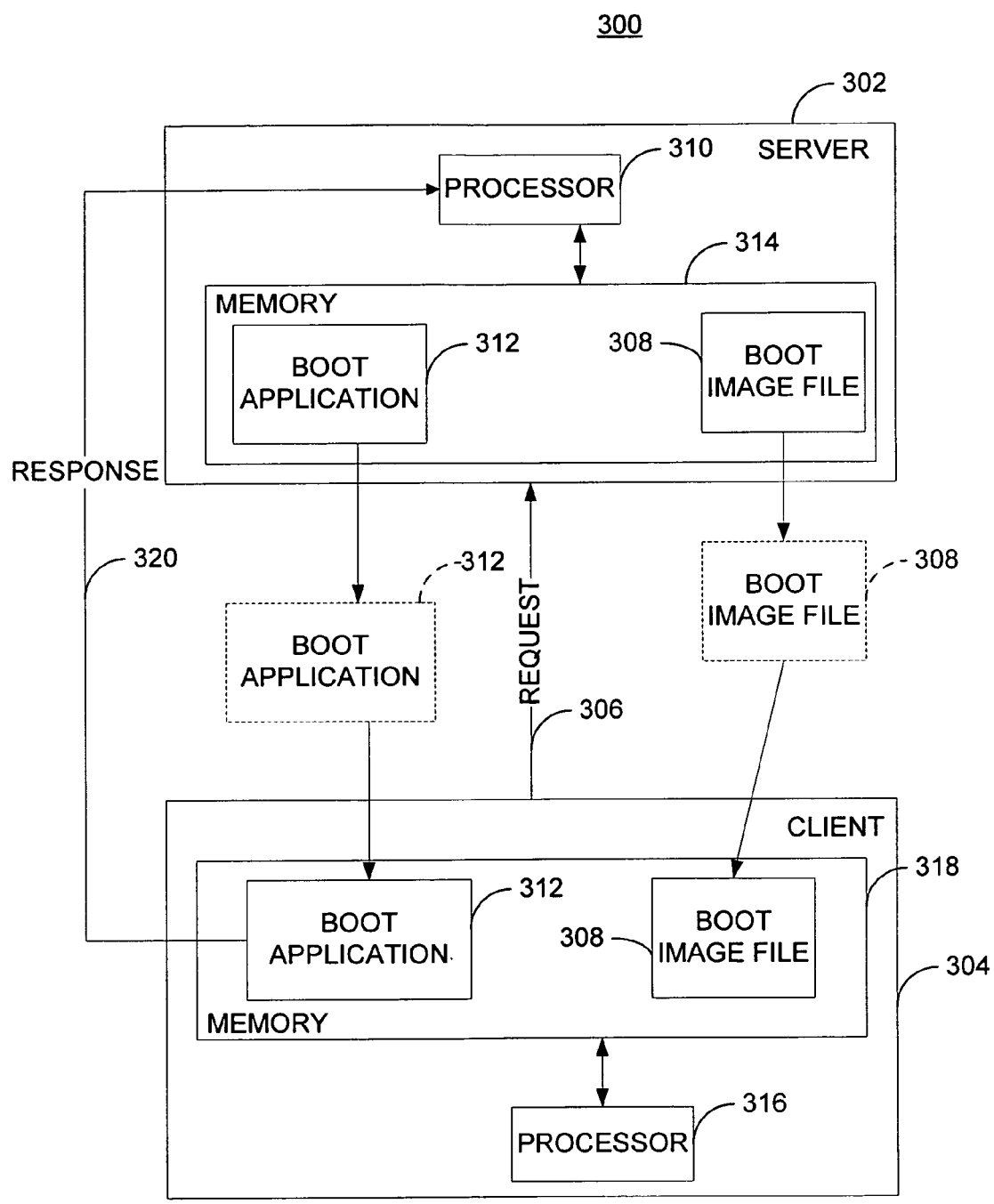
FIG. 3 is a block diagram illustrating a system for identifying characteristics of a client in a pre-boot environment according to an embodiment of the invention.

FIG. 3 is a block diagram illustrating a system 300 for identifying characteristics of a client in a pre-boot environment according to an embodiment of the invention. The system 300 includes a server 302 (e.g., PXE server 204) and a client 304 (e.g., clients 104). Initially, the client 304 sends a request 306 to the server 302 for a boot image file 308. In response to the received request 306, a processor 310 of server 302 sends a boot application 312 stored in a memory 314 to client 304. Unlike the prior systems in which the server sends a generic or standard boot image file to the client in response to the client's request, embodiments of the invention minimize the amount of data the client has to download and to keep the client from having to boot two instances of an OS or a pre-OS file.

Upon receiving the boot application 312, a processor 316 of client 304 executes the boot application 312 by accessing a memory 318 storing boot application 312. In one embodiment, the boot application is a 16-bit real mode network boot program that determines or identifies the computing architecture of client 304. It is to be understood that other types of boot programs (e.g., protected mode boot program) may be used in determining or identifying the computing architecture of client 304.

In one embodiment, boot application 312, after execution by the processor 316, performs a test for identifying whether client 304 is 64-bit compatible. In this embodiment, the test includes setting a value for a particular control option in registers of processor 316 and identifying another value, as a response 320, to be returned to server 302. In this example, the value returned by processor 316 indicates whether client 304 supports 64-bit computer-executable instructions. In another embodiment, the response 320 includes at least the information of processor 316 of client 304.

In response to the returned value, boot application 312 sends the response 320 to processor 310 of server 302. In one example, the response includes a value included in a DHCP option field. In one embodiment, the value for the DHCP option field corresponds to the characteristics of the client. In another example, response 320 configures a value for a DHCP option field #250 in server 302. The processor 310 of server 302 may further evaluate the value in the DHCP option field #250 to determine the information of the computing architecture of client 304.

Based on the received response, processor 310 of server 302 identifies the computing architecture of client 304 and transmits the boot image file 308 to the client 304. The processor 316 of client 304 next executes the boot image file 308 to boot the client 304.

As such, embodiments of invention enable users or administrators of server 302, based on response 320 from boot application 312, to select an appropriate boot image file to boot client 304 before an OS or a pre-OS is installed in client 304. By avoiding sending unnecessary or incompatible boot image files to client 304, aspects of the invention efficiently configure and boot client 304 using boot application 312.

Figure 4:
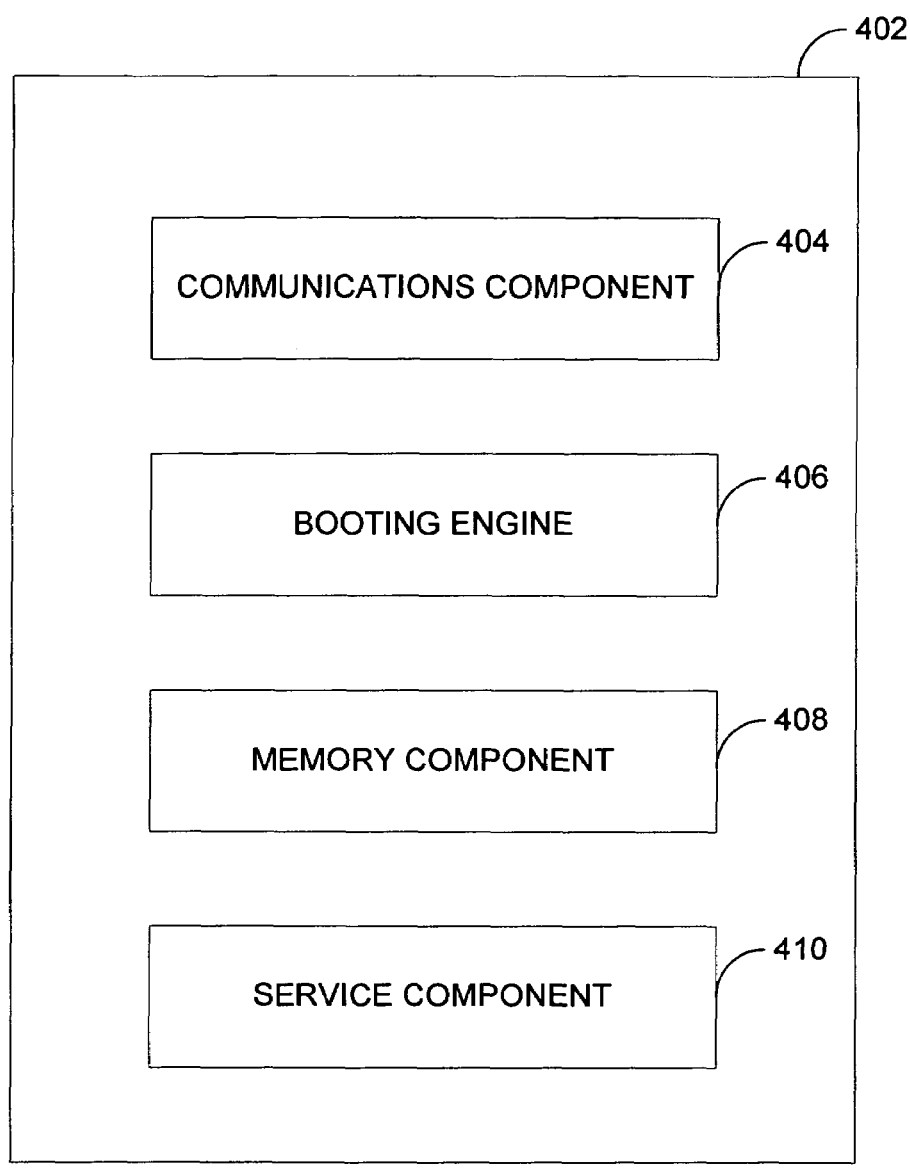
FIG. 4 is a block diagram illustrating an exemplary computer-readable medium on which aspects of the invention may be stored.

Referring now to FIG. 4, a block diagram illustrates an exemplary computer-readable medium 402 on which aspects of the invention may be stored. For example, components illustrated in FIG. 4 execute one or more computer-executable instructions described in the flow chart of FIG. 5 for identifying characteristics of a client in a pre-boot environment according to an embodiment of the invention.

For example, a communications component 404 receives a packet from the client (e.g., client 304) at 502. The packet includes a request for an image to boot the client by a server (e.g., server 302). At 504, the communications component 404 transmits a booting engine 406 as a boot application from the server to the client in response to the received request. The boot engine 406 generates a response relating to the information associated with the computing architecture of the client for the server. At 506, the generated response is provided to the communications component 404 and the server received the response from the communications component 404. At 508, the server processes the response and determines or identifies the computing architecture of the client based on the received response from the booting engine. A memory component 408 stores a plurality of images for booting the client. A service component 410, being responsive to the information associated with the determined architecture, selects at least one of the plurality of images to be transmitted by the communications component 404 to the client for booting the client. In one embodiment, the service component 410, based on the received response, configures a value for a DHCP option field #250 in the server. In another embodiment, service component 410 evaluates the value in the DHCP option field #250 for determining the information of the computing architecture of the client.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to the processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

Figure 5:
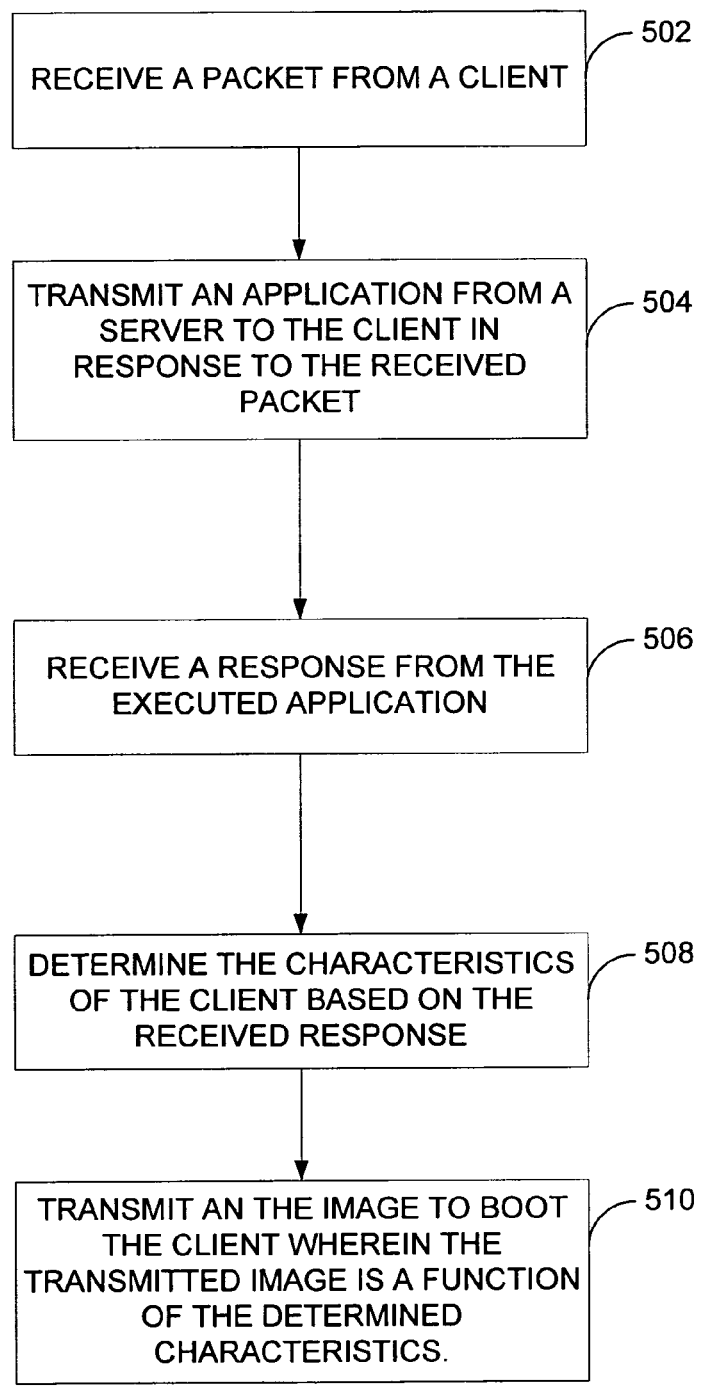
FIG. 5 is an exemplary flow chart illustrating operation of identifying characteristics of a client in a pre-boot environment according to an embodiment of the invention.

In operation, computer 130 executes computer-executable instructions such as those illustrated in FIG. 5 to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method implemented at least in part by a server for determining characteristics of a client in a pre-boot environment, said method comprising:
   receiving a packet from the client at the server, said packet including a request for an image to boot the client, said server capable of providing a plurality of images to boot clients with different computing architectures;
   determining whether the received packet specifies computing architecture information of the client;
      if the received packet specifies the computing architecture information of the client, sending the requested image corresponding to the specified computing architecture information of the client from the server to the client;
      if the received packet fails to specify the computing architecture information of the client;
         prior to responding to the received packet with a requested image transmitting an application to the client in response to the received packet, wherein the application, when executed by the client, determines the computing architecture information of the client;
         receiving a response at the server from the application executed by the client, said received response including the computing architecture information of the client as determined by execution of the transmitted application;
         determining the characteristics of the client based on the received response; and
         transmitting an image from the plurality of images from the server to boot the client wherein the transmitted image is a function of the determined characteristics.

2. The method of claim 1, wherein the application is a 16-bit real mode network boot program.

3. The method of claim 1, wherein the received response includes a value included in a dynamic host configuration protocol (DHCP) option field.

4. The method of claim 3, wherein the DHCP option field is DHCP option 93, and wherein the value for the DHCP option field corresponding to the characteristics of the client.

5. The method of claim 1, wherein the characteristics of the client includes at least information relating to an architecture type of the client.

6. The method of claim 1, wherein one or more computer-readable media have computer-executable instructions for performing the method of claim 1.

7. A system for determining computing characteristics of a client in a pre-boot environment, said system comprising a server having a processor for executing computer-executable instructions for:
   receiving a packet from the client, said packet including a request for an image to boot the client, said server capable of providing a plurality of images to boot clients with different computing architectures;
   determining whether the received packet specifies computing architecture information of the client:
      if the received packet specifies the computing architecture information of the client, sending the requested image corresponding to the specified computing architecture information of the client from the server to the client;
      if the received packet fails to specify the computing architecture information of the client;
         prior to respond to the received packet with a requested image, transmitting an application to the client in response to the received packet, wherein the client executes the transmitted application;
         receiving a response from the application executed by the client, said received response including the computing architecture information of the client;
         determining the characteristics of the client based on the received response; and
         transmitting an image from the plurality of images from the server to boot the client wherein the transmitted image is a function of the determined characteristics.

8. The system of claim 7, wherein the application includes a 16-bit real mode network boot program.

9. The system of claim 7, wherein the received response includes a value included in a dynamic host configuration protocol (DHCP) option field.

10. The system of claim 9, wherein the DHCP option field is DHCP option 93, and wherein the value for the DHCP option field corresponding to the characteristics of the client.

11. The system of claim 7, wherein the characteristics of the client includes at least information relating to an architecture type of the client.

12. The system of claim 7, wherein the processor, based on the received response, configures a value for a DHCP option field #250 in the server.

13. The system of claim 12, wherein the processor is further configured to evaluate the value in the DHCP option field #250 for determining the characteristics of the client.

14. One or more computer storage media having computer-executable components for selecting an image for booting a client in a pre-boot environment based on information relating to a computing architecture of said client, said computer-executable components comprising:
   a communications component for receiving a packet from the client, said packet including a request for the image to boot the client by a server, said server capable of providing a plurality of images to boot clients with different computing architectures, wherein it is determined whether the received packet specifies computing architecture information of the client,
      if it is determined that the received packet specifies the computing architecture information of the client, a service component is configured to select the requested image from the plurality of images corresponding to the specified computing architecture information of the client to be transmitted to the client, if the received packet fails to specify the computing architecture information of the client;

a booting engine for transmission by the communications component to the client in response of the received request and prior to respond to the received packet with a requested image, said booting engine for generating a response from the client and provided to the communications component, said response specifies the computing architecture information of the client;

a memory component for storing a plurality of images; and the service component responsive to the specified computing architecture information from the booting engine received by the communications component for selecting at least one of the plurality of images to be transmitted by the communications component from the server to the client for booting the client.

15. The computer storage media of claim 14, wherein the booting engine includes a 16-bit real mode network boot program.

16. The computer storage media of claim 14, wherein the generated response includes a value included in a dynamic host configuration protocol (DHCP) option field.

17. The computer-readable media of claim 16, wherein the DHCP option field is DHCP option 93, and wherein a value for the DHCP option field corresponding to the characteristics of the client.

18. The computer storage media of claim 14, wherein the information relating to the computing architecture of the client includes at least information of processing unit of the client.

19. The computer storage media of claim 14, wherein the service component, based on the received response, configures a value for a DHCP option field #250 in the server.

20. The computer storage media of claim 19, wherein the service component further evaluating the value in the DHCP option field #250 for determining the information of the computing architecture of the client.

* * * * *